(12) United States Patent
Ruff et al.

(10) Patent No.: US 11,220,187 B1
(45) Date of Patent: Jan. 11, 2022

(54) RECEIVER FOR CHARGING STATION

(71) Applicant: Mod.al, Draper, UT (US)

(72) Inventors: Preston Ruff, Draper, UT (US); Erick Vega, Salt Lake City, UT (US); Kreg Peeler, Draper, UT (US)

(73) Assignee: Mod.al, Draper, UT (US)

( * ) Notice: Subject to any disclaimer, the term of this patent is extended or adjusted under 35 U.S.C. 154(b) by 0 days.

(21) Appl. No.: 17/369,615

(22) Filed: Jul. 7, 2021

(51) Int. Cl.
*B60L 53/16* (2019.01)
*B60L 53/35* (2019.01)
*B60L 53/18* (2019.01)

(52) U.S. Cl.
CPC ............ *B60L 53/16* (2019.02); *B60L 53/18* (2019.02); *B60L 53/35* (2019.02)

(58) Field of Classification Search
None
See application file for complete search history.

(56) References Cited

U.S. PATENT DOCUMENTS

| 2012/0286730 A1* | 11/2012 | Bonny | B60L 53/35 320/109 |
| 2020/0101856 A1* | 4/2020 | Klausner | B60L 50/50 |

FOREIGN PATENT DOCUMENTS

DE  102011114321 A1 *  3/2013  ............ B60L 53/16

OTHER PUBLICATIONS

DE-102011114321-A1 Machine Translation. (Year: 2021).*

* cited by examiner

*Primary Examiner* — David V Henze-Gongola
(74) *Attorney, Agent, or Firm* — Kirton McConkie; Brian Tucker

(57) ABSTRACT

A receiver may be used with a charging station or other power delivery solution. The receiver can be configured to be maneuvered beneath a plug that is electrically coupled to a battery or other component of a vehicle. The receiver can include an opening into which the plug is inserted. The opening can form contacts for establishing an electrical connection with contacts on the plug. The receiver can include a cover that protects the contacts when the plug is not inserted into the opening.

20 Claims, 17 Drawing Sheets

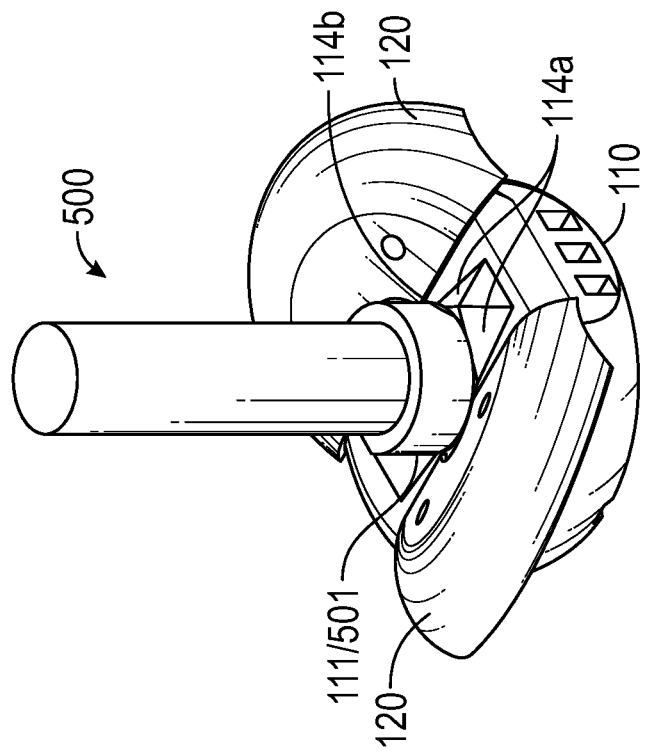
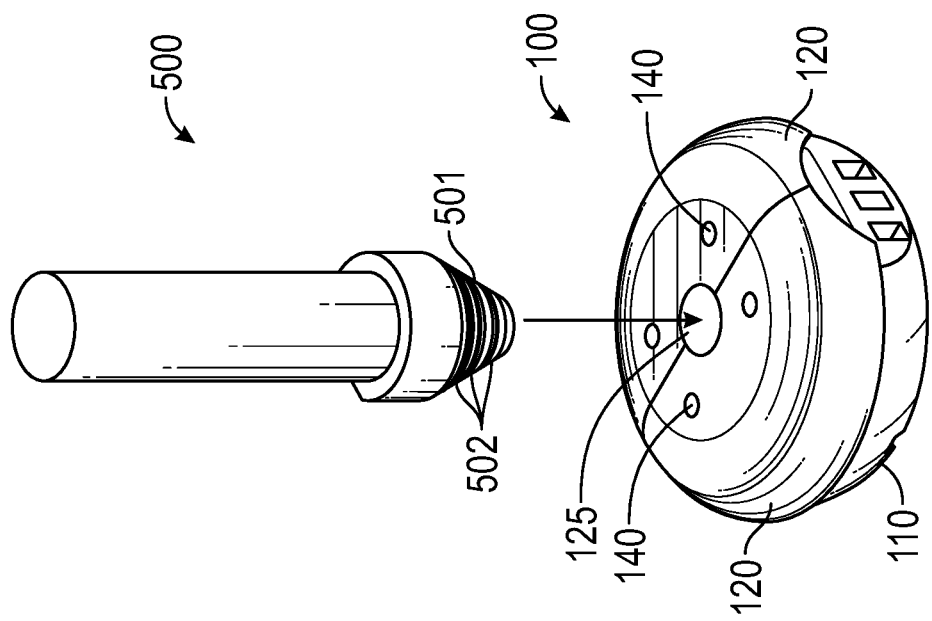
FIG. 5B
FIG. 5A

RECEIVER FOR CHARGING STATION

CROSS-REFERENCE TO RELATED APPLICATIONS

N/A

BACKGROUND

Electrical vehicles (or EVs), whether cars, trucks or otherwise, must be frequently recharged. For this purpose, an EV typically has a charging port that is located on the side of the vehicle. In such cases, to charge the EV, a driver must exit the EV and plug a cord into the charging port.

Some attempts have been made to develop automated charging solutions. For example, some solutions employ a robotic arm that plugs the charging cord into the charging port. These solutions are bulky, expensive and obstruct the pathway around the EV. Other solutions employ induction to wirelessly charge the EV. Such solutions are complex and often require significant structural investments/modifications such as embedding an inductive plate in the concrete, asphalt or other base material. Wireless solutions are also incapable of performing level 3 "rapid" charging.

Because of such complexities, cost, and limitations, automated charging solutions have not been widely adopted. Instead, the vast majority of EV owners simply plug in their EVs just like any other electronic device.

BRIEF SUMMARY

The present invention extends to a receiver for a charging station or other power delivery solution. The receiver can be configured to be maneuvered beneath a plug that is electrically coupled to a battery or other component of a vehicle. The receiver can include an opening into which the plug is inserted. The opening can form contacts for establishing an electrical connection with contacts on the plug. The receiver can include a cover that protects the contacts when the plug is not inserted into the opening.

In some example embodiments, the present invention is implemented as a receiver that includes a housing having a base that is adapted for sliding the receiver along a surface. The housing may also form an opening for receiving a plug. The opening includes a plurality of contacts. The receiver also includes one or more covers that are coupled to the housing. The one or more covers are configured to move relative to the housing to expose the plurality of contacts.

In some embodiments, the housing may include a top surface opposite the base and the opening extends through the top surface. In some embodiments, the opening may be tapered.

In some embodiments, the base may be flat. In some embodiments, the base may include one or more drain channels that extend outwardly from the opening.

In some embodiments, the one or more covers may include opposing outer covers and an inner cover. In some embodiments, the inner cover may be configured to move into the opening. In some embodiments, the opposing outer covers may be configured to move outwardly away from the opening. In some embodiments, the opposing outer covers may also be configured to pivot downwardly while moving outwardly away from the opening. In some embodiments, the housing includes one or more protrusions having one or more sloped surfaces oriented towards the opposing outer covers. In some embodiments, the one or more protrusions also have one or more sloped surfaces oriented towards the opening.

In some embodiments, the plurality of contacts may be ring-shaped.

In some embodiments, the receiver may also include one or more sensors for detecting a position of a plug relative to the receiver.

In some embodiments, the one or more covers are configured to rotate relative to the housing to expose the plurality of contacts. In some embodiments, the receiver may include a cable for causing the one or more covers to rotate.

In some embodiments, the housing is configured to be connected to an extender of a charging station.

In some example embodiments, the present invention may be implemented as a receiver that includes: a housing having a flat base and a vertically-oriented opening that extends through the flat base; a plurality of ring-shaped contacts formed within the opening; an inner cover that is configured to descend into the opening; and opposing outer covers that are configured to move outwardly away from the opening.

In some embodiments, the receiver may also include one or more sensors positioned on the opposing outer covers.

In some embodiments, the inner cover and the opposing outer covers are biased into a closed position in which the opening is covered.

In some example embodiments, the present invention may be implemented as a receiver that includes a housing that forms an upwardly oriented opening in which a plurality of contacts are formed. The housing may be adapted to slide underneath a vehicle that includes a plug. The receiver may also include one or more covers that are configured to selectively expose the plurality of contacts to enable the plug to descend into the opening to form an electrical connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 5A and 5B illustrate how a plug can be inserted into the receiver of FIGS. 1A-1D;

DETAILED DESCRIPTION

Figure 1A:
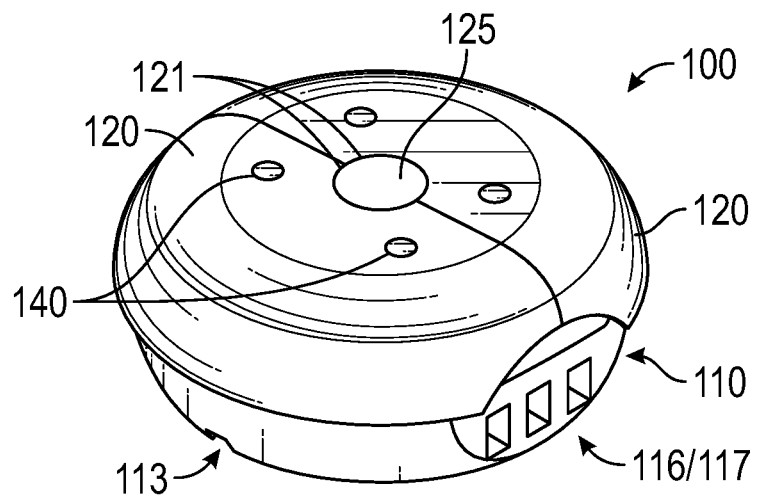
FIGS. 1A-1D are top perspective, top, side and bottom views respectively of a receiver configured in accordance with one or more embodiments of the present invention when the receiver is in a closed position.
Figure 1B:
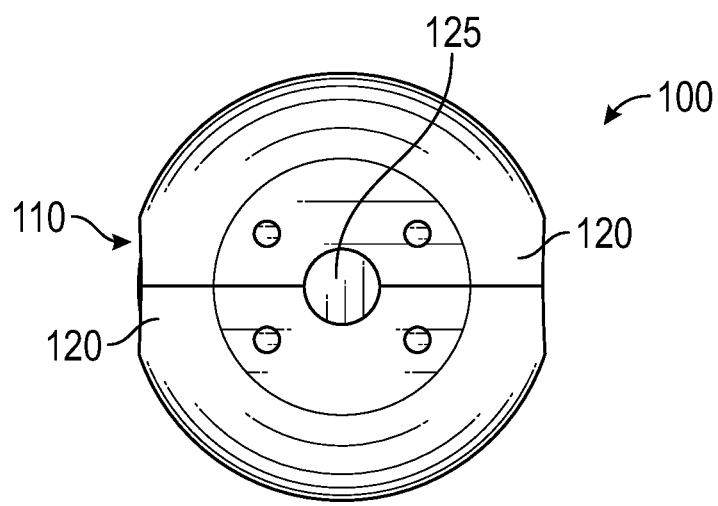
Figure 1C:
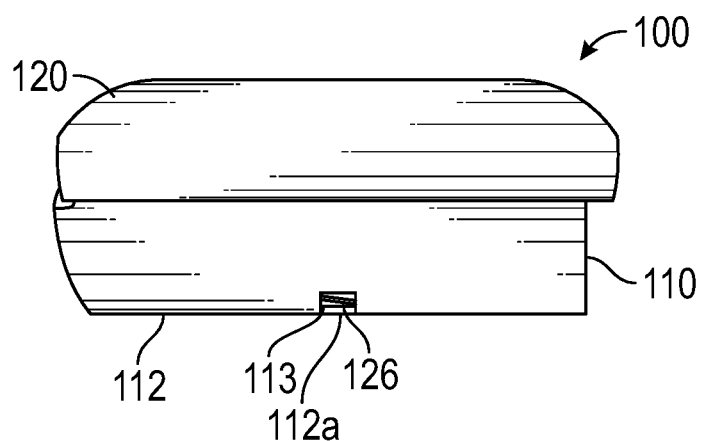
Figure 1D:
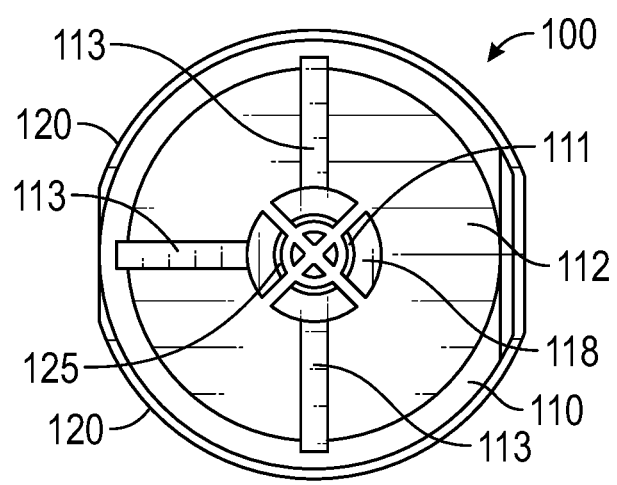
Figure 2A:
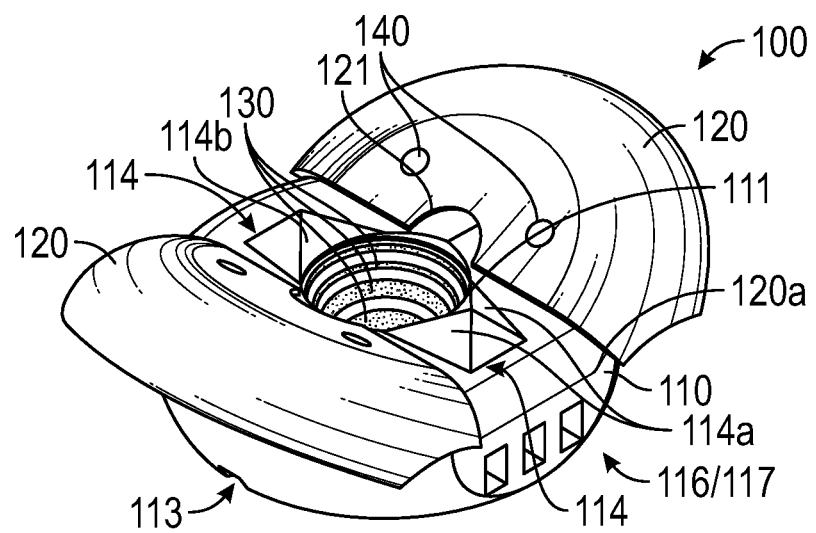
FIGS. 2A-2D are top perspective, top, side and bottom views respectively of the receiver of FIGS. 1A-1D when the receiver is in an open position.
Figure 2B:
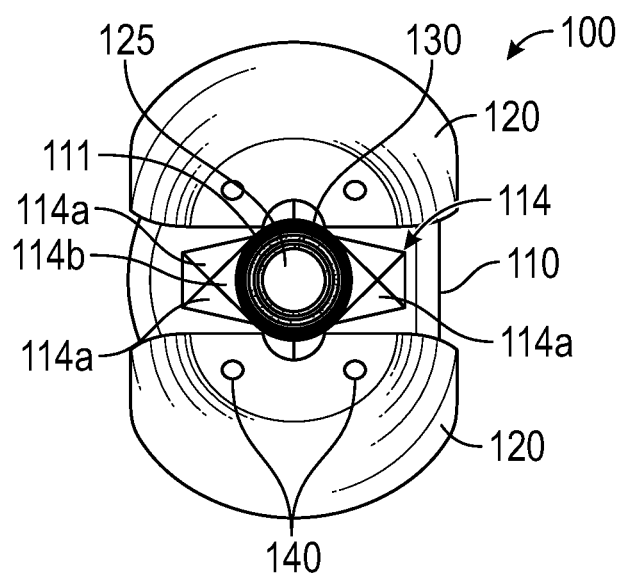
Figure 2C:
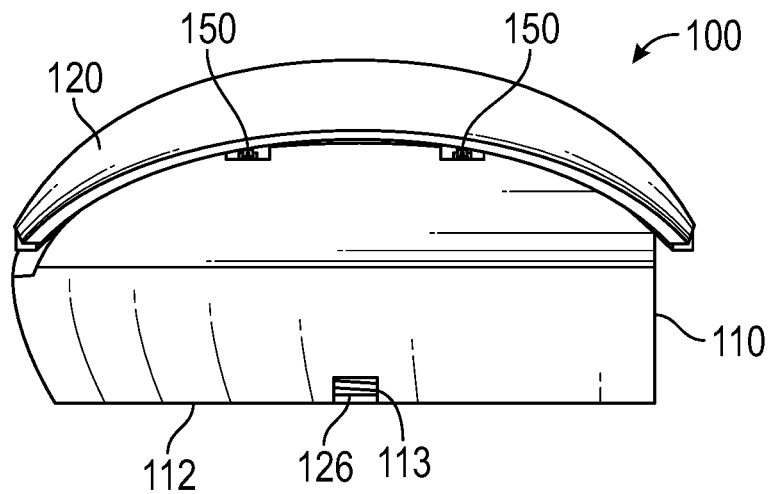
Figure 2D:
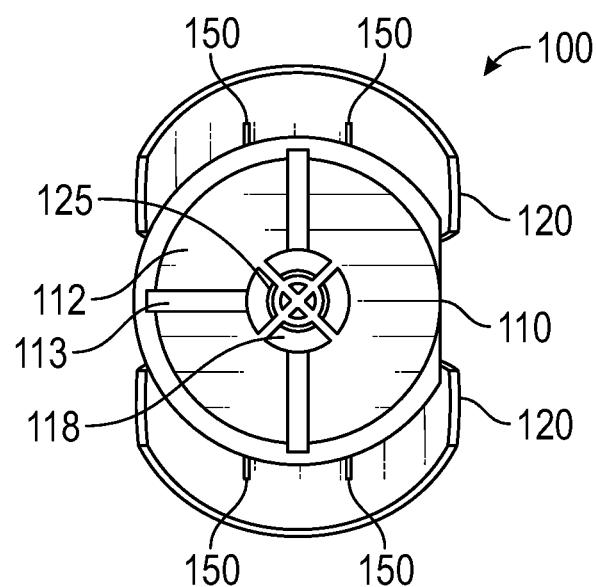
Figure 3A:
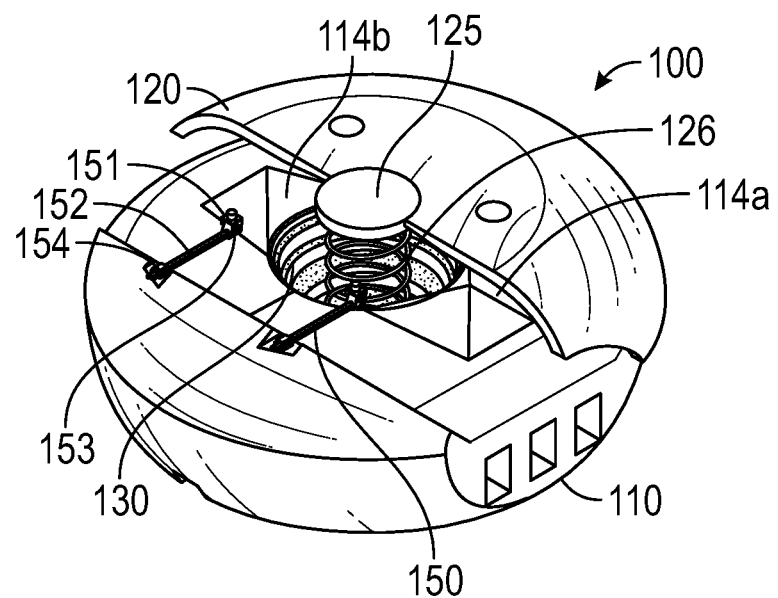
FIGS. 3A and 3B are top perspective and side views respectively of the receiver of FIGS. 1A-1D with a cover removed when the receiver is in a closed position.
Figure 3B:
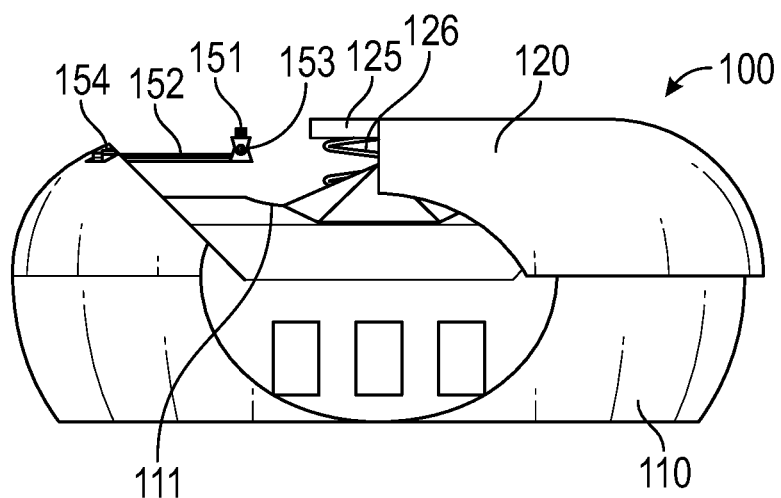
Figure 3C:
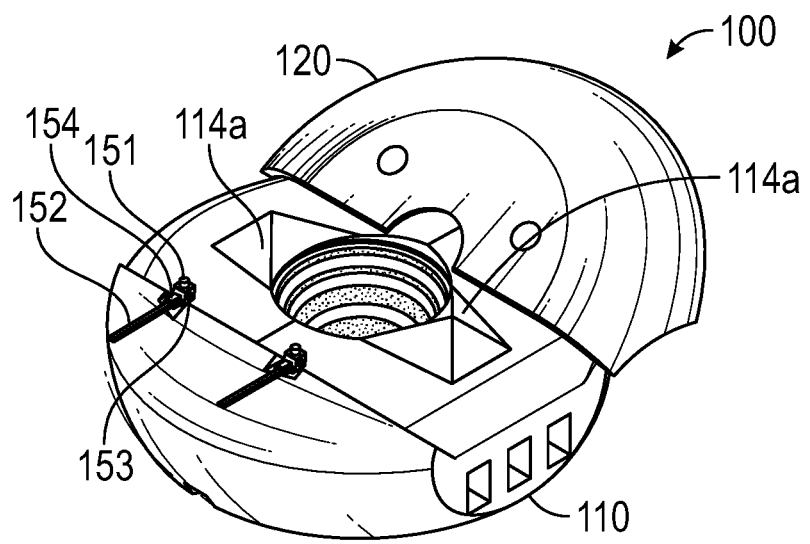
FIGS. 3C and 3D are top perspective and side views respectively of the receiver of FIGS. 1A-1D with an outer cover removed when the receiver is in an open position.
Figure 3D:
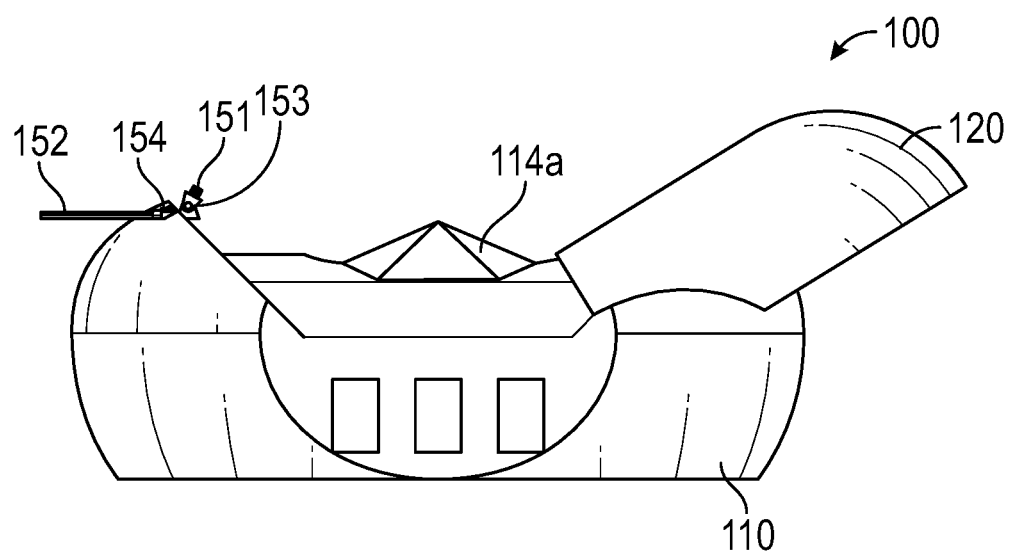

A receiver configured in accordance with one or more embodiments of the present invention may be used with a charging station or other power delivery solution to facilitate the automatic and intelligent establishment of an electrical connection with a vehicle's power and/or electrical/control system. For example, a receiver may enable a charging station to locate a position of a plug on a vehicle to thereby maneuver the receiver beneath the plug. Once the receiver is positioned beneath the plug, the receiver's configuration can enable an electrical connection to be established by lowering the plug into the receiver.

FIGS. 1A-5B provide a number of views of a receiver 100 that is configured in accordance with one or more embodiments of the present invention. FIGS. 1A-1D provide views of receiver 100 when in a closed position. In some embodiments, receiver 100 may be in the closed position whenever it is not connected to a plug. FIGS. 2A-2D provide views of receiver 100 when in an open position. In some embodiments, receiver 100 may be in the open position only when a plug (not shown) is inserted into receiver 100. Therefore, FIGS. 2A-2D can be viewed as omitting the plug that would have caused receiver 100 to be in the open position.

Receiver 100 may include a housing 110 having an opening 111 that is vertically oriented and extends through housing 110. Opening 111 may be positioned centrally to thereby give housing 110 a doughnut shape. Opening 111 may be tapered to receive a tapered tip of a plug. A base 112 of housing 110 may be generally flat to facilitate sliding of receiver 100 along the floor. In some embodiments, base 112 may include a number of replaceable frictionless pads to further facilitate sliding receiver 100 along concrete, asphalt or other surfaces where a vehicle may be parked.

One or more drain channels 113 may be formed in base 112 and may extend from opening 111 through the exterior wall of base 112. Drain channels 113 can enable water (or other fluids) that may enter opening 111 to flow out through base 112 rather than accumulate in opening 111. In some embodiments, a recess 118 may be formed in base 112 surrounding opening 111 to facilitate the flow of water into drain channels 113.

Receiver 100 may include opposing outer covers 120 and an inner cover 125 that is positioned within opposing notches 121 formed in outer covers 120. In some embodiments, inner cover 125 may have a circular shape. In some embodiments, outer covers 120 and inner cover 125 may include silicone gaskets or other sealing mechanisms that ensure that a watertight seal is formed between the covers when they are in the closed position.

In some embodiments, one or more sensors 140 may be positioned within outer covers 120 or possibly within inner cover 125 and may be used to detect a position of a plug relative to receiver 100 as described in greater detail below. Housing 110 may include one or more power ports 116 and one or more data ports 117 by which receiver 100 may be connected to a charging station or other power delivery solution.

Outer covers 120 are configured to slide/pivot outwardly to selectively expose opening 111 and contacts 130 formed therein. In some embodiments, the lowering of a plug towards opening 111 while outer covers 120 are in the closed position may force outer covers 120 apart into the open position. To facilitate the pivoting of outer covers 120 as they are slid outwardly, housing 110 may include protrusions 114 on opposing sides of opening 111. Each protrusion 114 may include opposing sloped surfaces 114a that are oriented towards outer covers 120 to thereby allow an inner edge 120a of outer cover 120 to drop as outer cover 120 is slid outwardly away from opening 111. Each protrusion 114 may also include an inner sloped surface 114b that is oriented towards opening 111. Inner sloped surfaces 114b can assist in guiding a plug into opening 111 if the plug is not aligned with opening 111 as it descends.

FIGS. 3A-3D illustrate receiver 100 with one outer cover 120 removed to thereby reveal supports 150. In some embodiments, receiver 100 may include a pair of supports 150 for each outer cover 120. Each support 150 may include a first component 151 that is configured to be secured to the underside of outer cover 120 (e.g., via a threaded connection) and a second component 152 that is connected to first component 151 via a pin 153 or another mechanism that enables first component 151 to pivot relative to second component 152. In other words, first component 151 and second component 152 can form a hinge that allows outer cover 120 to pivot. In some embodiments, second component 152 may have an elongated shape and may be secured to housing 110 via a bracket 154 that allows second component 152 to slide relative to housing 110. For example, second component 152 may slide within bracket 154 to thereby allow outer cover 120 to slide outwardly away from opening 111. In some embodiments, second component 152 may be biased inwardly so that outer covers 120 will be in the closed position absent an external force (e.g., by a spring that is positioned around second component 152 and that is compressed between first component 151 and bracket 154). It is noted, however, that any suitable mechanism could be used to couple outer covers 120 to housing 110 in a manner that enables outer covers to be selectively withdrawn from overtop opening 111.

Figure 4A:
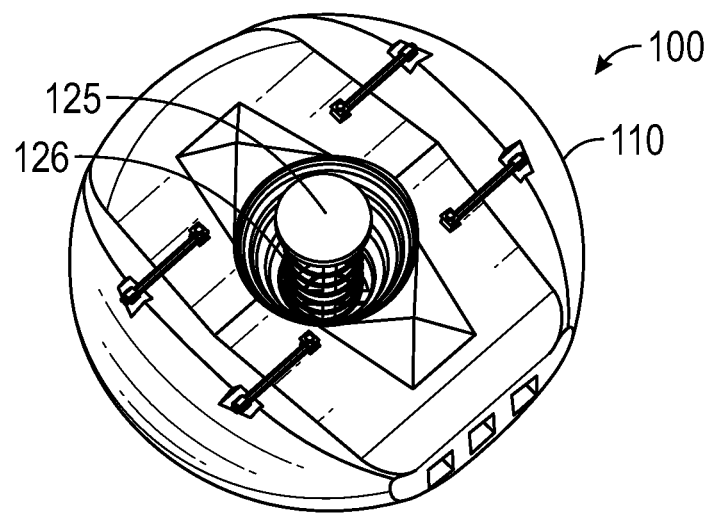
FIGS. 4A and 4B are top perspective and bottom perspective views respectively of the receiver of FIGS. 1A-1D with both outer covers removed.
Figure 4B:
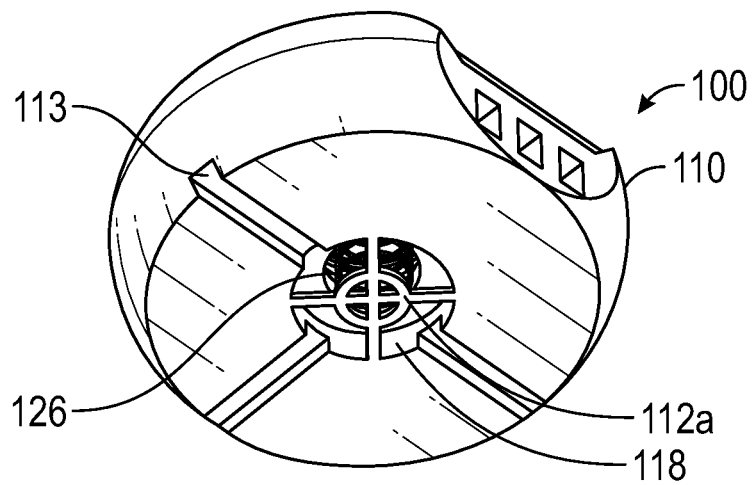
Figure 4C:
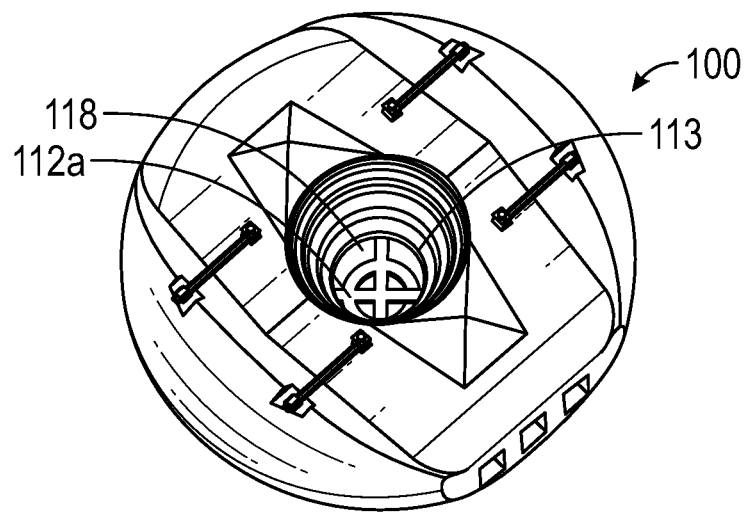
FIGS. 4C and 4D are top perspective and bottom perspective views respectively of the receiver of FIGS. 1A-1D with both outer covers, the inner cover and inner cover spring removed.
Figure 4D:
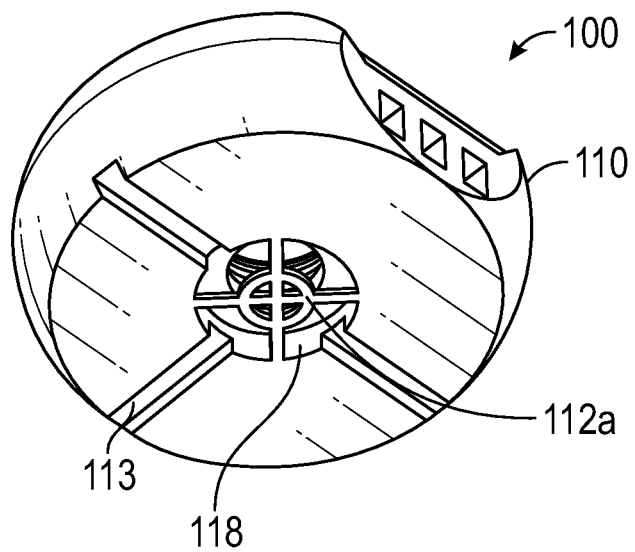
Figure 6A:
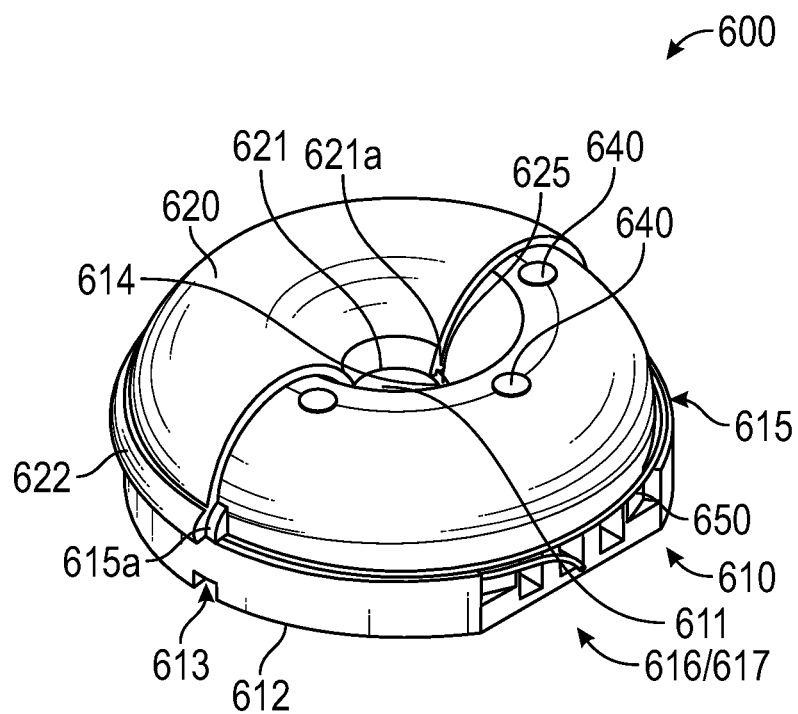
FIGS. 6A-6D are top perspective, top, side and bottom views respectively of another receiver configured in accordance with one or more embodiments of the present invention when the receiver is in a closed position.
Figure 6B:
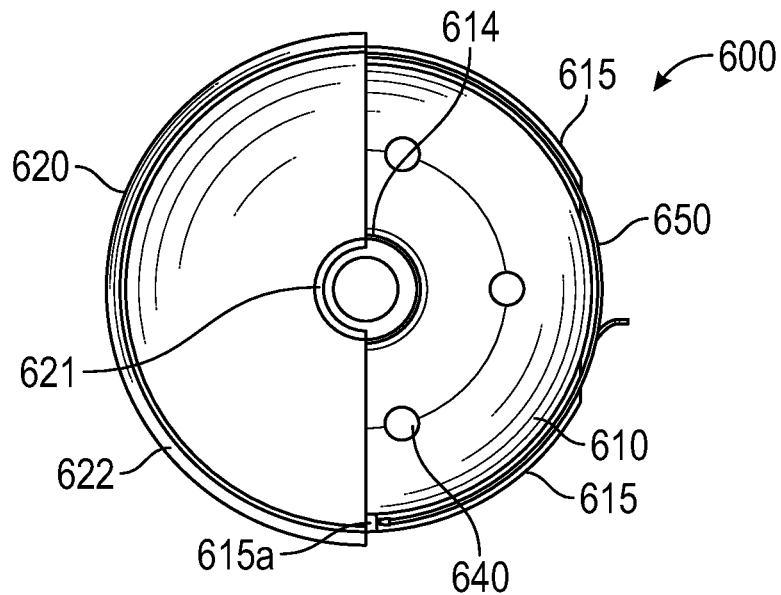
Figure 6C:
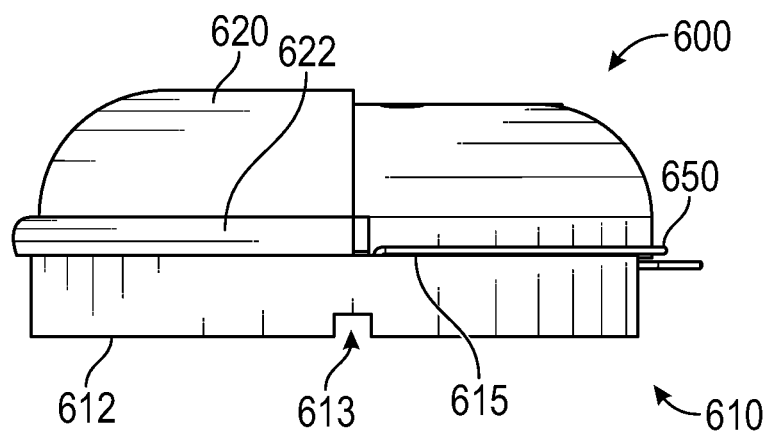
Figure 6D:
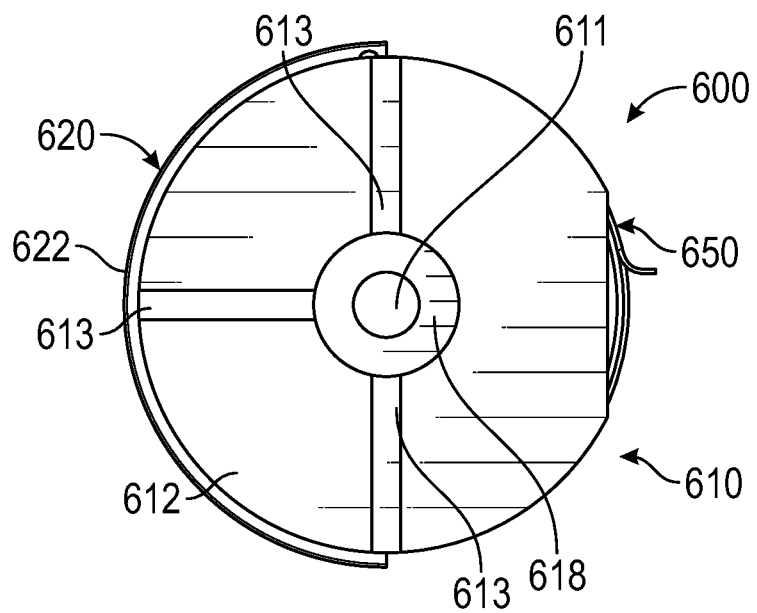
Figure 7A:
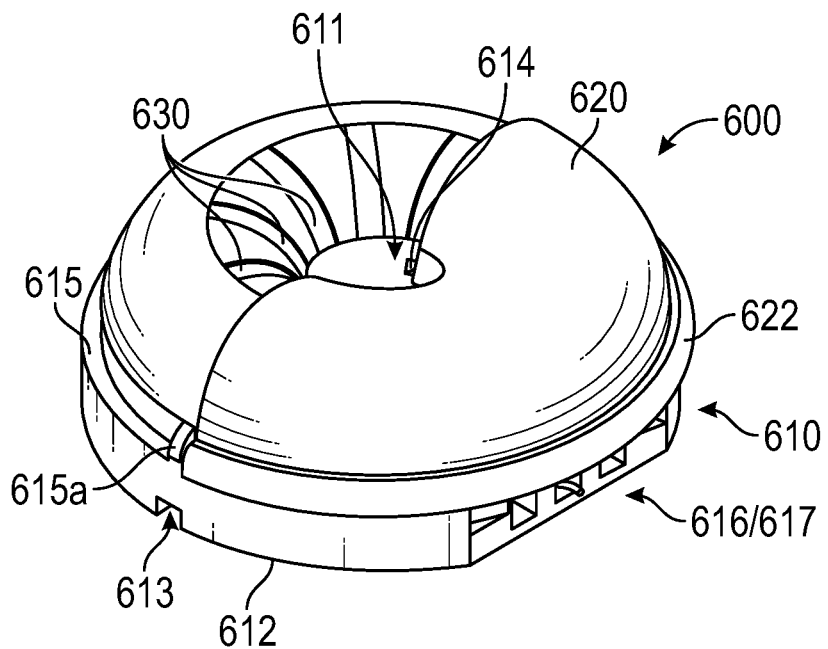
FIGS. 7A-7D are top perspective, top, side and bottom views respectively of a receiver of FIGS. 6A-6D when the receiver is in an open position.
Figure 7B:
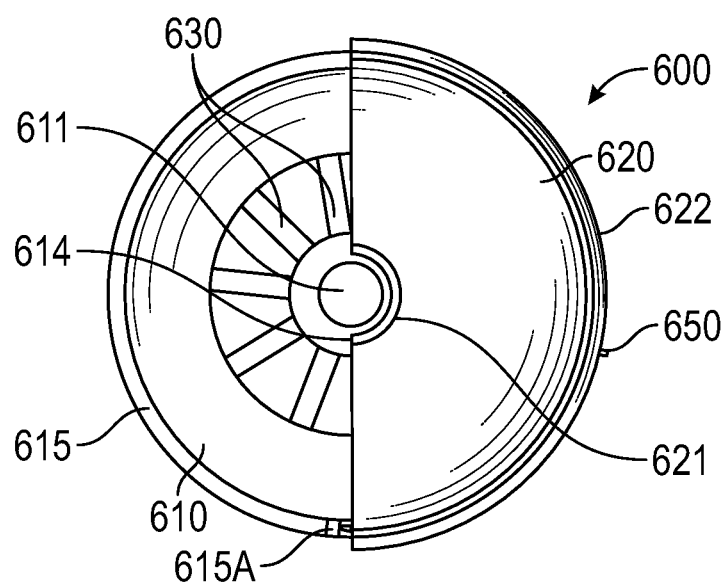
Figure 7C:
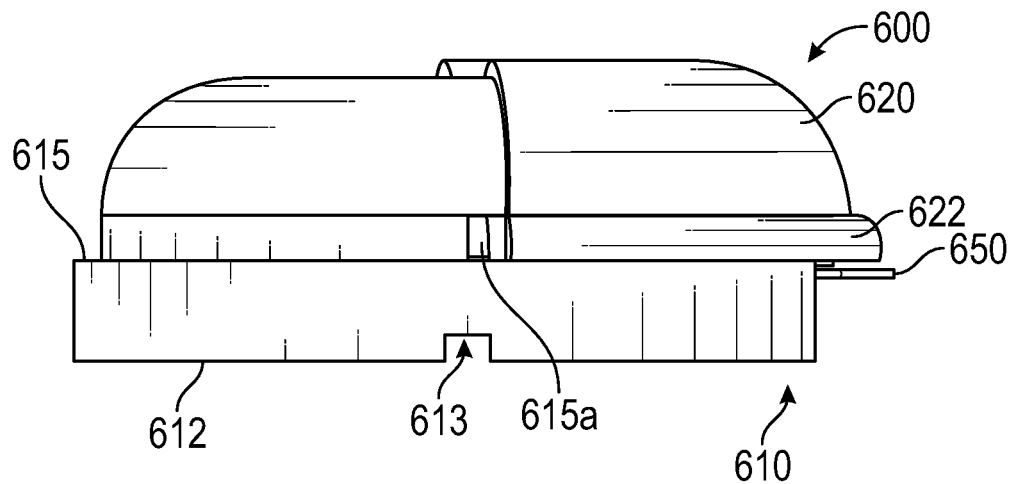
Figure 7D:
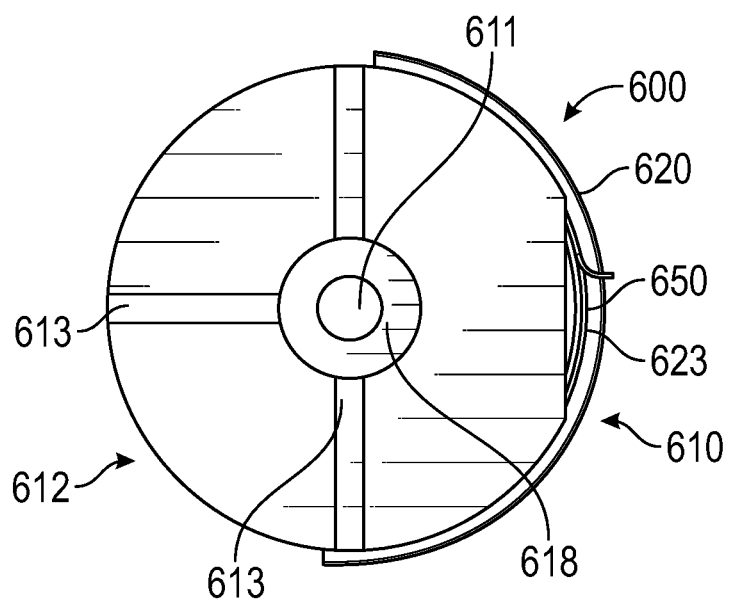
Figure 8B:
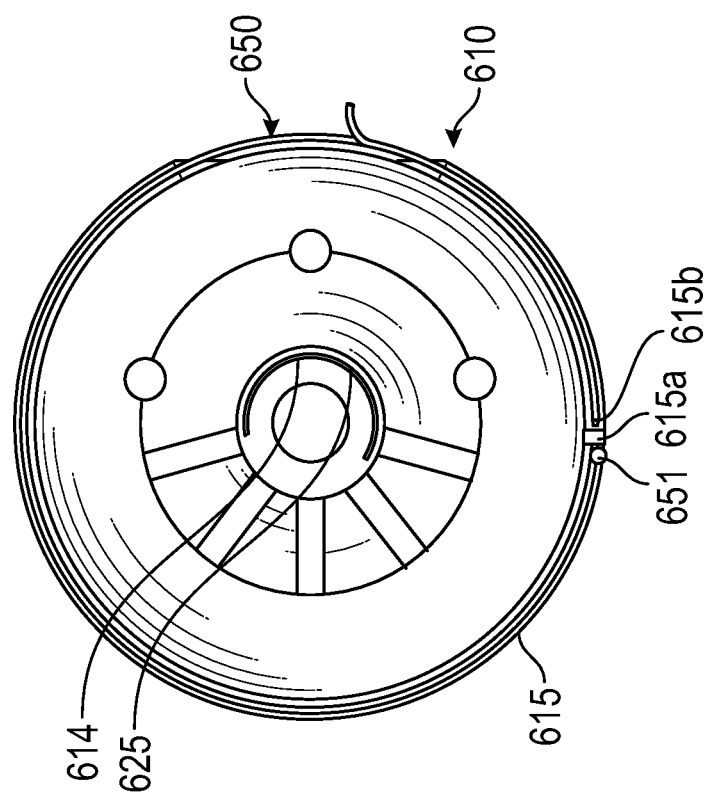
FIG. 8B is an isolated top view of a receiver housing of the receiver of FIGS. 6A-6D.
Figure 8A:
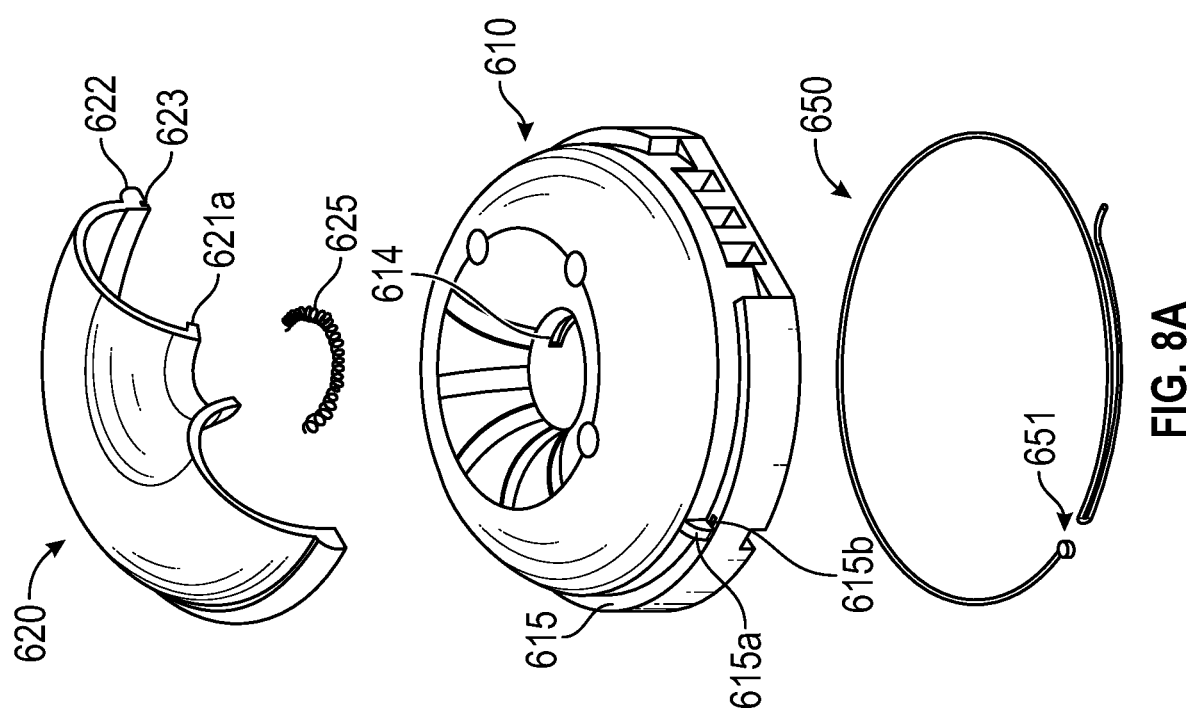
FIG. 8A is an exploded view of the receiver of FIGS. 6A-6D.
Figure 8C:
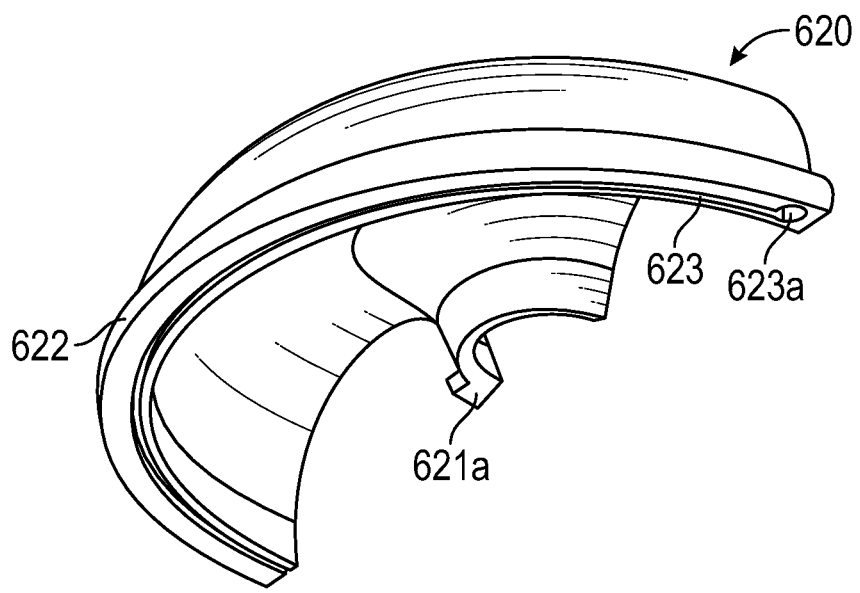
FIGS. 8C and 8D are bottom perspective and bottom isolated views respectively of a cover of the receiver of FIGS. 6A-6D.
Figure 8D:
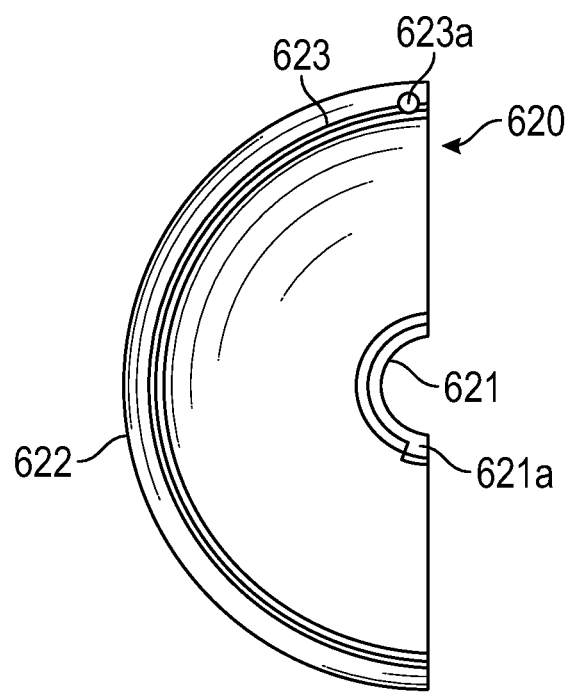

Inner cover 125 is configured to descend into opening 111 as a plug is inserted into opening 111. In some embodiments, a spring 126 may support inner cover 125 and bias it into the closed position. In such embodiments, a plug may compress spring 126 as it is lowered into opening 111. Then, when the plug is lifted, spring 126 may force inner cover 125 back into the closed position. As is best seen in FIGS. 4A and 4B, which illustrate receiver 100 with both outer covers 120 removed and in FIGS. 4C and 4D which illustrate receiver 100 with both outer covers, inner cover 125 and spring 126 removed, in some embodiments, base 112 may form a spring support 112a that spans, or is otherwise positioned within, recess 118 without blocking the fluid pathway between opening 111 and drain channels 113.

FIGS. 5A and 5B provide an example of how a plug 500 can be lowered towards and into receiver 100 to form an electrical connection. Plug 500 may have a tip 501 that is sized and tapered to match the size and taper of opening 111. Contacts 502 may also be formed around tip 501 and may correspond with contacts 130. In some embodiments, contacts 130 may be formed as a series of rings that are spaced at different vertical positions within opening 111. In such cases, there may be multiple rings dedicated to power delivery which may be sufficiently sized to support the delivery of power at high voltages (e.g., 200V-500V). In some embodiments, there may also be multiple rings dedicated to data delivery. Housing 110 may include circuitry/wiring by which power ports 116 and data port(s) 117 are electrically coupled to contacts 130.

As represented in FIG. 5A, receiver 100 can be positioned directly beneath plug 500. In some embodiments, as described in greater detail below, a charging station may maneuver receiver 100 into this position and my leverage sensors 140 to do so. With receiver 100 positioned beneath plug 500, plug 500 can be lowered (e.g., by extending a telescoping mechanism of plug 500 or using any other suitable mechanism or technique) towards receiver 100. As plug 500 descends, it will contact inner cover 125 and force it downwardly into opening 111 while compressing spring 126. Additionally, as plug 500 descends, the tapered tip 501 will apply an outward and downward force on outer covers 120. Due to the configuration of supports 150, outer covers 120 can slide outwardly and inner edge 120a can pivot downwardly along sloped surfaces 114a. As a result, opening 111 will only become exposed as tip 501 inserts into opening 111.

Once tip 501 is fully inserted into opening 111, contacts 130 and contacts 502 may align. Notably, because of the ring shape of contacts 130 and contacts 502, plug 500 can be inserted into receiver 100 at any rotational angle (i.e., there is no need to rotate plug 500 or receiver 100 during insertion). In some embodiments, a charging station with which receiver 100 is used can be configured to detect when contacts 130 and contacts 502 are in contact and, in response, can commence supplying power via such contacts. In other words, the charging station may only commence supplying power via receiver 100 when plug 500 is correctly coupled to receiver 100. This can prevent an accidental discharge or arcing.

FIGS. 6A-9C provide a number of views of another receiver 600 that is configured in accordance with one or more embodiments of the present invention. FIGS. 5A-5D provide views of receiver 600 when in a closed position. FIGS. 7A-7D provide views of receiver 600 when in an open position. As with receiver 100, in some embodiments, receiver 600 may be in the open position when a plug (not shown) is inserted into receiver 600. FIG. 8A is an exploded view of receiver 600. FIG. 8B shows receiver 600 with cover 620 removed. FIGS. 8C and 8D show cover 620 in isolation.

Receiver 600 may include a housing 610 having an opening 611 that is vertically oriented and extends through housing 610. The top surface of housing 610 may be curved inwardly towards opening 611 such that housing 610 has a doughnut shape. Opening 611 may be tapered to receive a tapered tip of a plug. A base 612 of housing 610 may be generally flat to facilitate sliding of receiver 600 along the floor. In some embodiments, base 612 may include a number of replaceable frictionless pads to further facilitate sliding receiver 600 along concrete, asphalt or other surfaces where a vehicle may be parked. Base 612 may include one or more drain channels 613 and a recess 618 similar to drain channels 113 and recess 118 respectively. Base 612 may also include power ports 616 and data port(s) 617 similar to power ports 116 and data port(s) 117.

Receiver 600 may include a cover 620 that is configured to rotate around housing 610 to selectively expose contacts 630. In some embodiments, cover 620 may have a semi-circular shape and may include a notch 621 that aligns with and surrounds opening 611. In some embodiments, base 612 may form a ridge 615 over which a lip 622 of cover 620 may be positioned. Lip 622 may slide along ridge 615 as cover 620 rotates between the closed and open positions. In some embodiments, a channel 614 may be formed at least partially around opening 611 and cover 620 may include a tab 621a that extends inwardly (i.e., towards lip 622) from notch 621. Tab 621a can insert into and slide within channel 614 to thereby secure cover 620 to base 612. In some embodiments, a spring 625 may be positioned within channel 614 and may be compressed by tab 621a as cover 620 is rotated into the open position. Spring 625 can therefore function to bias cover 620 into the closed position.

Receiver 600 may include one or more sensors 640 that are similar to sensors 140. However, sensors 640 may be positioned on the portion of housing 610 that is exposed when cover 620 is in the closed position. As with sensors 140, sensors 640 may be used to detect the relative location of a plug to thereby allow receiver 600 to be maneuvered beneath the plug.

Receiver 600 can be configured in a variety of ways to enable cover 620 to be rotated between the closed and open positions. For example, in the depicted embodiments, a cable 650 extends around cover 620 and may be used to pull cover 620 from the closed position to the open position. As is best shown in FIGS. 8A-8D, a channel 623 may be formed in the underside of lip 622 and may house a portion of cable 650. Channel 623 may include an expanded area 623a for receiving an expanded end 651 of cable 650. As a result, when cable 650 is pulled away from receiver 600, cover 620 will be rotated around opening 611. In some embodiments, a stop 615a may extend upwardly from ridge 615 to limit the rotation of cover 620 to approximately 180 degrees.

In some embodiments, cable 650 may form a nearly complete circle that extends around ridge 615 when cover 620 is in the closed position. In particular, when cover 620 is in the closed position, expanded end 651 of cable 650 may be positioned adjacent to stop 615a and cable 650 may be routed through an opening 615b that extends through ridge 615 on the opposite side of stop 615a. In some embodiments, stop 615a can be offset from power ports 616 and data port(s) 617 (e.g., by approximately 90 degrees). After passing through opening 615b, cable 650 can be routed back towards power ports 616 and data port(s) 617 and may extend to a base unit of a charging station which can be configured to apply a pulling force to the cable. Accordingly, as cable 650 is pulled, expanded end 651 will be pulled along ridge 615 towards opening 615b which in turn will pull cover 620 until lip 622 contacts stop 615a. Once this pulling force ceases (and/or once a plug is withdrawn from opening 611), spring 625 can cause cover 620 to return to the closed position.

Figure 9C:
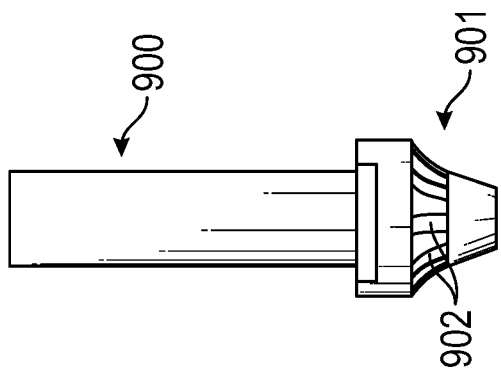
FIGS. 9A-9C illustrate how a plug can be inserted into the receiver of FIGS. 6A-6D.
Figure 9B:
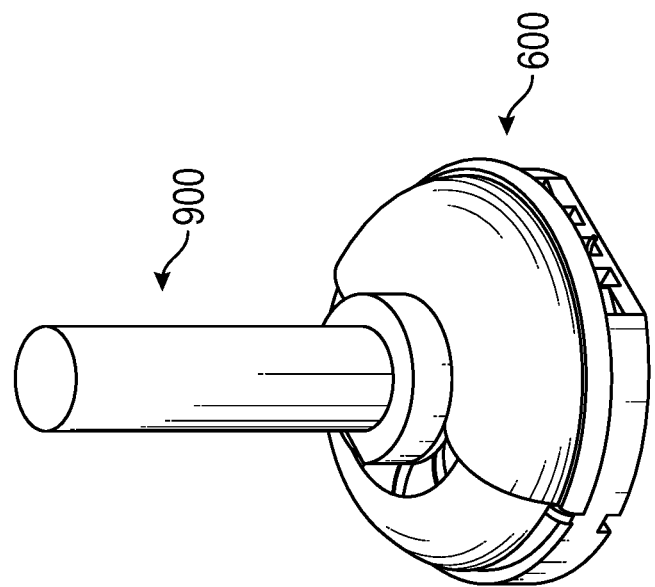
Figure 9A:
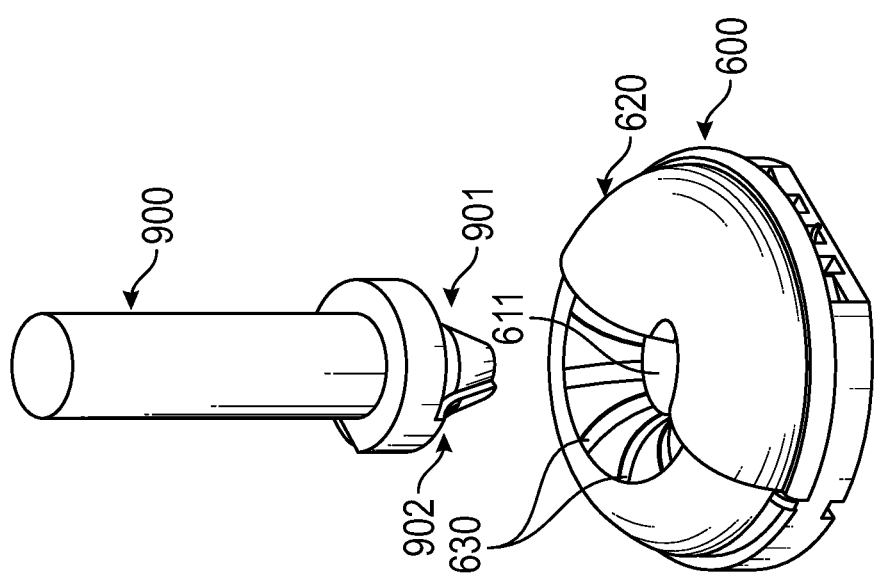

FIGS. 9A-9C provide an example of how a plug 900 can be lowered towards and into receiver 600 to form an electrical connection. Plug 900 may have a tip 901 that is sized and tapered to match the size and taper of opening 611. As shown in FIG. 9C, contacts 902 may also be formed around tip 901 and may correspond with contacts 630.

When receiver 600 is positioned beneath plug 900, cable 650 can be pulled to cause cover 620 to rotate into the open position. Plug 900 can then be lowered to position tip 901 within opening 611 to thereby form an electrical connection between contacts 902 and contacts 630. Plug 900 may be rotated as necessary to ensure that contacts 902 are in alignment with contacts 630.

Figure 10A:
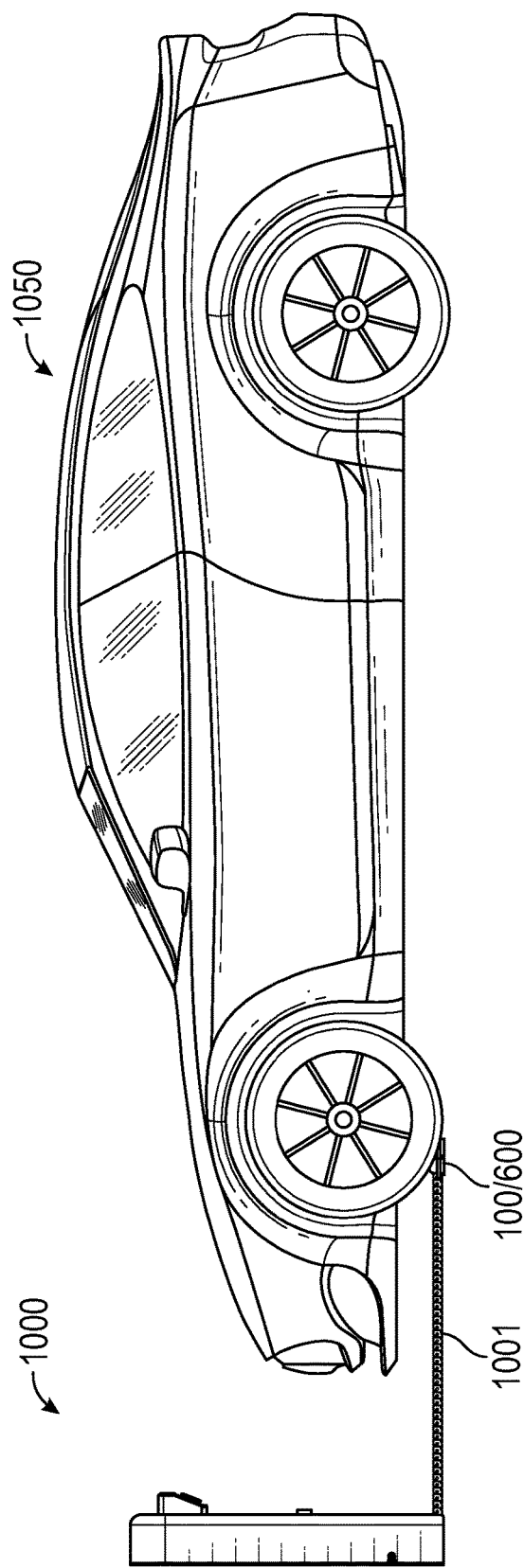
FIGS. 10A and 10B provide an example of how a receiver configured in accordance with one or more embodiments of the present invention can be used with a charging station.
Figure 10B:
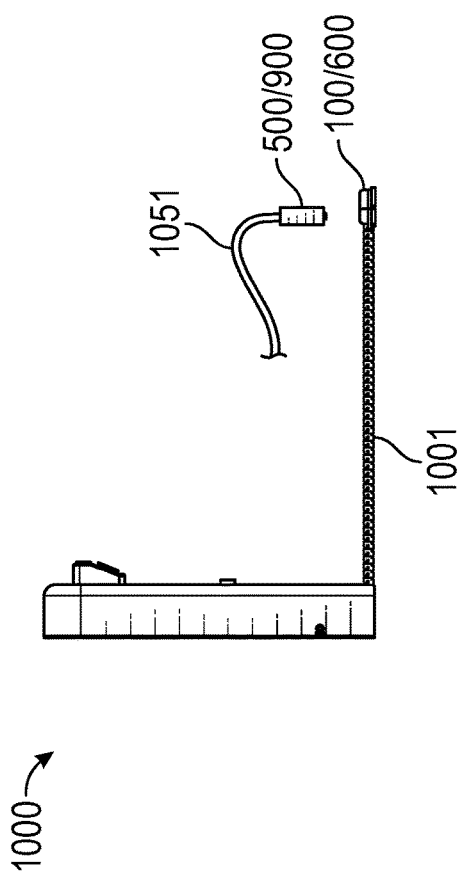

FIGS. 10A and 10B provide an example of how a receiver configured in accordance with one or more embodiments of the present invention can be used with a charging station to enable the charging station to automatically and intelligently connect to a vehicle's power and/or electrical system. FIG. 10A shows that a vehicle 1050 has been parked near a charging station 1000. As shown in FIG. 10B, vehicle 1050 may include an onboard unit 1051 that includes a plug such as plug 500 or plug 900. In some embodiments, onboard unit 1051 may have a telescoping configuration by which plug 500/900 is lowered.

Charging station 1000 can be configured to maneuver receiver 100/600 under vehicle 1050 to position the receiver beneath plug 500/900. Charging station 1000 may include a control system that can leverage sensors 140/640 to detect the position of receiver 100/600 relative to plug 500/900 and drive an extender 1001 appropriately. For example, extender 1001 can be configured to extend and retract and to be slid back and forth so that vehicle 1050 need not be parked in a precise location relative to charging station 1000. U.S. patent application Ser. No. 17/351,983, which is incorporated herein by reference, provides additional detail of suitable charging stations with which a receiver configured in accordance with one or more embodiments of the present invention may be used.

A receiver configured in accordance with one or more embodiments of the present invention may include a heating element for melting snow or ice that may be present on the receiver or in the path of the receiver. In such cases, the heating element could be powered to facilitate maneuvering the receiver beneath a plug and/or opening the cover.

As suggested above, a receiver configured in accordance with one or more embodiments of the present invention may be used to automatically establish an electrical connection with a vehicle for a variety of purposes. For example, a receiver could be used to charge an electric vehicle's battery, to warm a diesel engine block or as a socket for any other connection. A receiver configured in accordance with one or more embodiments of the present invention could also be used for forming an automatic connection for other electrical, hydraulic or pneumatic systems. In some embodiments, a receiver could be used on a wall or in any other position or orientation relative to a plug. Therefore, embodiments of the present invention should not be limited to use cases where the receiver is positioned beneath the plug.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A receiver comprising:
    a housing having a base that is adapted for sliding the receiver along a surface to position the receiver under a plug, the housing also forming an upward-facing opening for receiving the plug when the plug is lowered into the upward-facing opening, the upward-facing opening including a plurality of contacts for delivering power to the plug; and
    one or more covers that are coupled to the housing, the one or more covers being configured to move relative to the housing to expose the plurality of contacts.

2. The receiver of claim 1, wherein the housing includes a top surface opposite the base and the upward-facing opening extends through the top surface.

3. The receiver of claim 2, wherein the upward-facing opening is tapered.

4. The receiver of claim 1, wherein the base is flat.

5. The receiver of claim 4, wherein the base includes one or more drain channels that extend outwardly from the upward-facing opening.

6. The receiver of claim 1, wherein the one or more covers comprise opposing outer covers and an inner cover.

7. The receiver of claim 1, wherein the plurality of contacts are ring-shaped.

8. The receiver of claim 1, further comprising:
    one or more sensors for detecting a position of the plug relative to the receiver.

9. The receiver of claim 1, wherein the housing is configured to be connected to an extender of a charging station.

10. A receiver comprising:
    a housing having a base that is adapted for sliding the receiver along a surface, the housing also forming an opening for receiving a plug, the opening including a plurality of contacts; and
    one or more covers that are coupled to the housing, the one or more covers being configured to move relative to the housing to expose the plurality of contacts;
    wherein the one or more covers comprise opposing outer covers and an inner cover;
    wherein the inner cover is configured to move into the opening.

11. The receiver of claim 10, wherein the opposing outer covers are configured to move outwardly away from the opening.

12. The receiver of claim 11, wherein the opposing outer covers are also configured to pivot downwardly while moving outwardly away from the opening.

13. The receiver of claim 12, wherein the housing includes one or more protrusions having one or more sloped surfaces oriented towards the opposing outer covers.

14. The receiver of claim 13, wherein the one or more protrusions also have one or more sloped surfaces oriented towards the opening.

15. A receiver comprising:
    a housing having a flat base that is adapted for sliding the receiver along a surface to position the receiver under a plug and an upward-facing opening for receiving the plug when the plug is lowered into the upward-facing opening, the upward-facing opening extending through the flat base;
    a plurality of ring-shaped contacts formed within the upward-facing opening for delivering power to the plug;
    an inner cover that is configured to descend into the upward-facing opening; and
    opposing outer covers that are configured to move outwardly away from the upward-facing opening.

16. The receiver of claim 15, further comprising:
one or more sensors positioned on the opposing outer covers.

17. The receiver of claim 15, wherein the inner cover and the opposing outer covers are biased into a closed position in which the upward-facing opening is covered.

18. The receiver of claim 15, further comprising:
protrusions on opposing sides of the upward-facing opening, each protrusion comprising an inner sloped surface that is oriented towards the upward-facing opening, each protrusion also comprising opposing sloped surfaces that are oriented towards the opposing outer covers.

19. The receiver of claim 15, wherein inner edges of the opposing outer covers drop as the opposing outer covers slide outwardly away from the upward-facing opening.

20. The receiver of claim 15, further comprising:
one or more supports for each outer cover, each support forming a hinge to allow the respective outer cover to pivot relative to the housing.

\* \* \* \* \*